United States Patent [19]
Smothers et al.

[11] Patent Number: 5,782,717
[45] Date of Patent: Jul. 21, 1998

[54] TRANSAXLE WITH DIFFERENTIAL ASSEMBLY

[75] Inventors: Daryl Smothers; Raymond Hauser, both of Sullivan, Ill.

[73] Assignee: Hydro-Gear Limited Partnership, Sullivan, Ill.

[21] Appl. No.: 697,883

[22] Filed: Aug. 29, 1996

[51] Int. Cl.⁶ ................................................ F16H 48/06
[52] U.S. Cl. ...................... 475/221; 475/220; 475/225
[58] Field of Search ............................ 475/220, 221, 475/230, 225, 248; 74/665 F, 665 G, 665 GC, 665 T

[56] References Cited

U.S. PATENT DOCUMENTS

| | | | |
|---|---|---|---|
| 649,020 | 5/1900 | Upton | 475/221 X |
| 2,882,752 | 4/1959 | Russell | 475/204 |
| 4,073,358 | 2/1978 | Szalai | 475/225 X |
| 4,437,530 | 3/1984 | Young et al. | 475/225 X |
| 4,779,699 | 10/1988 | Hatano | 475/221 X |
| 4,967,861 | 11/1990 | Oyama et al. | 475/230 X |
| 5,067,933 | 11/1991 | Hardesty et al. | 475/83 X |
| 5,435,790 | 7/1995 | Kota et al. | 475/221 |
| 5,533,943 | 7/1996 | Ichioka et al. | 475/221 X |
| 5,545,102 | 8/1996 | Burgman et al. | 475/230 |

*Primary Examiner*—Charles A. Marmor
*Assistant Examiner*—Peter T. Kwon
*Attorney, Agent, or Firm*—Thomas C. McDonough

[57] ABSTRACT

A transaxle assembly includes an output shaft which drives a differential assembly. The differential assembly includes a first gear comprised of a spur gear which is adapted to be driven by the output shaft, a sun gear movable with the first gear, a non-movable ring gear, a plurality of planet gears adapted to be drivingly connected to the ring gear and to be driven by the sun gear orbitally thereabout, a planet gear carrier for rotatably supporting the plurality of planet gears and movable therewith, and a differential carried by the planet gear carrier. The differential is adapted to drive an axle on which two wheels are mounted.

26 Claims, 4 Drawing Sheets ns, it is an object of the present invention to provide a differential

TRANSAXLE WITH DIFFERENTIAL ASSEMBLY

BACKGROUND OF THE INVENTION

This invention relates generally to axle drives for motor vehicles and, more particularly, to a transaxle having an improved differential assembly.

As is known, the use of a differential assembly in the transmission system of a motor vehicle allows the wheels to spin at different speeds. In the case of a vehicle traveling in a straight line, the axle shafts connected to the differential assembly will rotate at the same speed. However, when a turn or curve is encountered, the axle shaft nearest the inside of the turn will slow in rotational speed while the outer axle shaft will simultaneously increase in rotational speed. As such, the wheels, driven by the axle shafts are prevented from scuffing the surface across which they travel.

An example of a transaxle drive for motor vehicles is described in U.S. Pat. No. 5,330,394 to Hauser et al. The disclosure contained in this patent, in particular those passages directed to the use of a differential in conjunction with a hydrostatic transaxle, is hereby incorporated by reference in its entirety.

As illustrated by the '394 patent, conventional transaxle drive differential assemblies typically incorporate a four pinion or bevel gear system disposed in a fixed cage which is directly driven by the engine of the vehicle. Other bevel gear systems employing more than four bevel gears, such as eight, are also known in the art. Such multiple bevel gear systems are conventionally used in the design of differential assemblies as they allow for an increased amount of torque while reducing tooth stress load on the gears. Nevertheless, these multiple bevel gear systems have been seen to suffer drawbacks which make their use in transaxles undesirable.

Specifically, the transaxle drive differential assemblies found in the prior art are typically difficult to assemble within the transaxle housing owing to the number of fasteners required to be used in their construction. Furthermore, while utilizing multiple bevel gears in the transaxle drive differential assembly reduces stress loading on the bevel gears, there still remains an undesirable amount of overall loading. This loading has been seen to result in binding which reduces efficiency and may result in a seizure of the apparatus during operation.

There is also known in the art a differential which uses no fasteners. Specifically, this differential includes a bull gear having two oppositely disposed slots formed around a hole located in the center thereof and differential bevel gears mounted on two shafts which are orthogonal to each other. Particularly, two of these differential gears are mounted on a short shaft that extends from a block of metal which is positioned within the slots of the bull gear. The metal block is prevented from moving by two metal stampings that are prevented from falling off by being in contact with the top of the bevel gears on the axle shafts which are further in contact with a steel retainer that is affixed in a mating slot in the housing. However, as a result of this arrangement, the bevel gears cannot move beyond the limits of errors in tolerance of the components as the differential is constrained by the housing and the stampings that are interlocked with the components of the differential. Accordingly, this external constraint may create uneven loading between the two otherwise symmetrical bevel gears which is also undesirable.

From the foregoing, it is seen that there exists a need in the art for a transaxle drive differential assembly having increased torque, which may be easily constructed at a more economical cost, and which is subject to reduced and symmetrical loading. Therefore, as a result of these existing needs, it is an object of the present invention to reduce the number of fasteners required to construct the differential assembly thereby making the differential assembly easier and more economical to manufacture. Furthermore, it is object of the present invention to provide a differential which may be constructed without the need for maintaining tight tolerances. Additionally, it is object of the present invention to provide a transaxle drive differential assembly having "floating" bevel gears for allowing gear stress to be more evenly and optimally distributed.

SUMMARY OF THE INVENTION

In accordance with these objectives, a transaxle assembly is provided and includes an output shaft which drives a differential assembly. In particular, the differential assembly includes a first gear comprised of a spur gear which is adapted to be driven by the output shaft, a sun gear movable with the first gear, a non-movable ring gear, a plurality of planet gears adapted to be drivingly connected to the ring gear and to be driven by the sun gear orbitally thereabout, a planet gear carrier for rotatably supporting the plurality of planet gears and movable therewith, and a differential carried by the planet gear carrier. The differential is adapted to drive an axle on which two wheels are mounted. The longitudinal axis of the output shaft is spaced from the longitudinal axis of the axle in accordance with a preferred embodiment of the invention.

More specifically, the plurality of bevel planet gears comprises a pair of oppositely disposed bevel planet gears and a differential cross shaft or split shaft, generally "cross shaft", supported by the planet gear carrier is provided to maintain the pair of bevel planet gears in coaxial alignment. The planet gear carrier further includes a pair of mating slots in each of which a corresponding end of the differential cross shaft is floatingly supported such that the differential cross shaft is axially moveable within the mating slots.

In this manner a differential assembly is provided which is easier to manufacture and which allows the bevel gears to be positioned in the most optimal manner, i.e., by tooth contact as opposed to external constraints, whereby the loading may be more evenly distributed. The objects of this invention are also furthered by providing a fastenerless differential assembly in which the "planet gear carrier" serves the dual purpose of carrying the plurality of driving planet gears and housing the differential.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiment shown in the following drawings in which.

DETAILED DESCRIPTION

Figure 1:
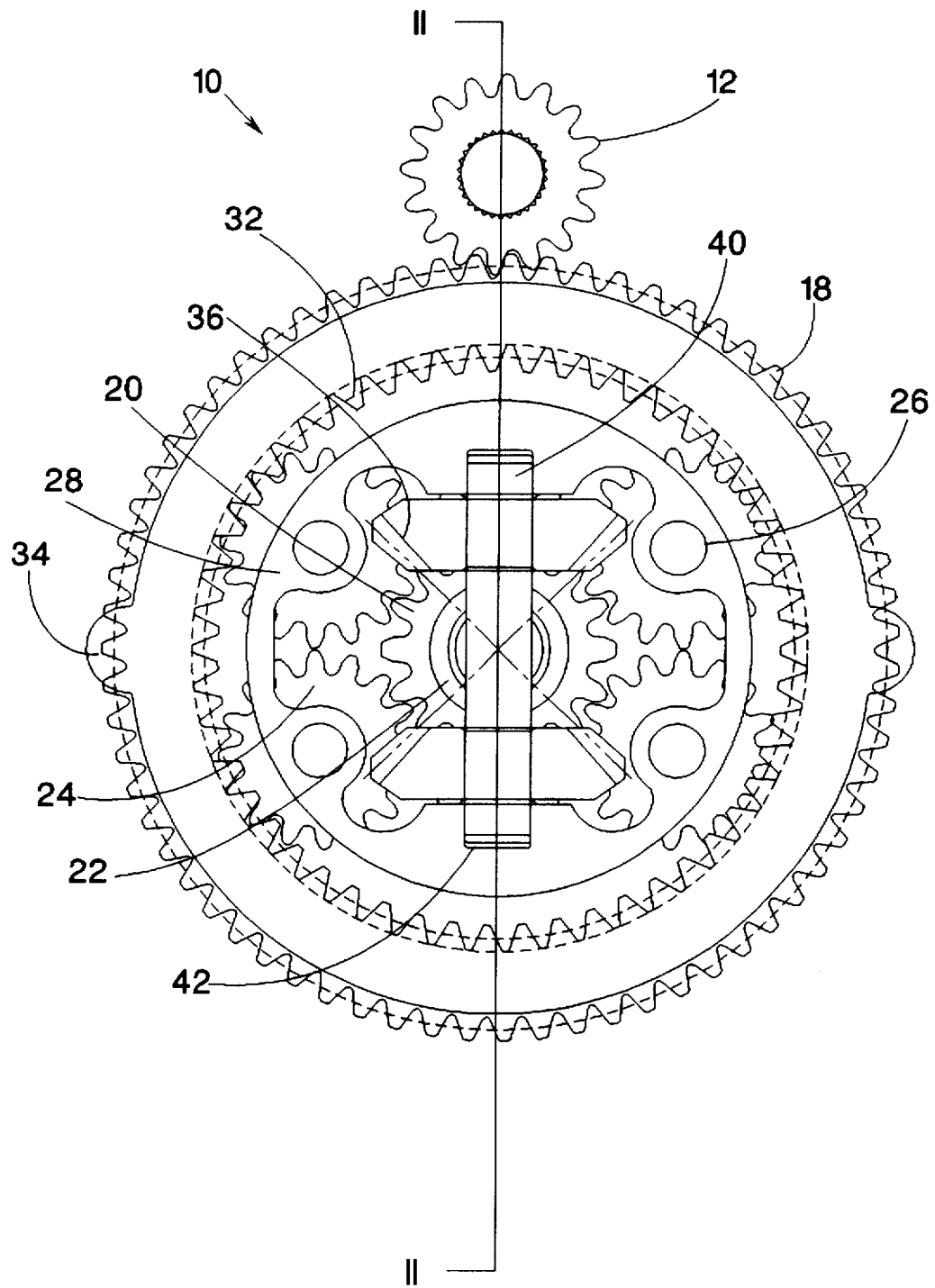
FIG. 1 illustrates a side view of the differential assembly constructed in accordance with the present invention.
Figure 2:
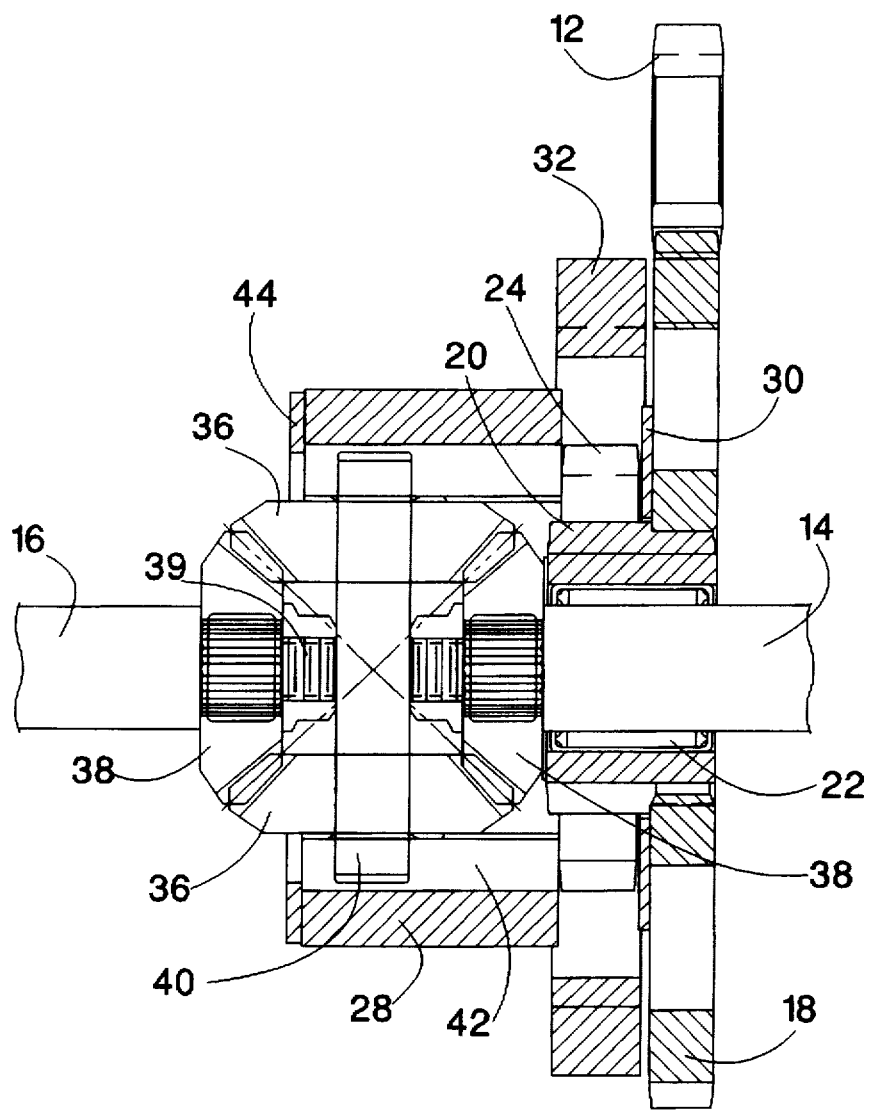
FIG. 2 illustrates a cross-sectional view of the differential assembly along the line II—II in FIG. 1.
Figure 3:
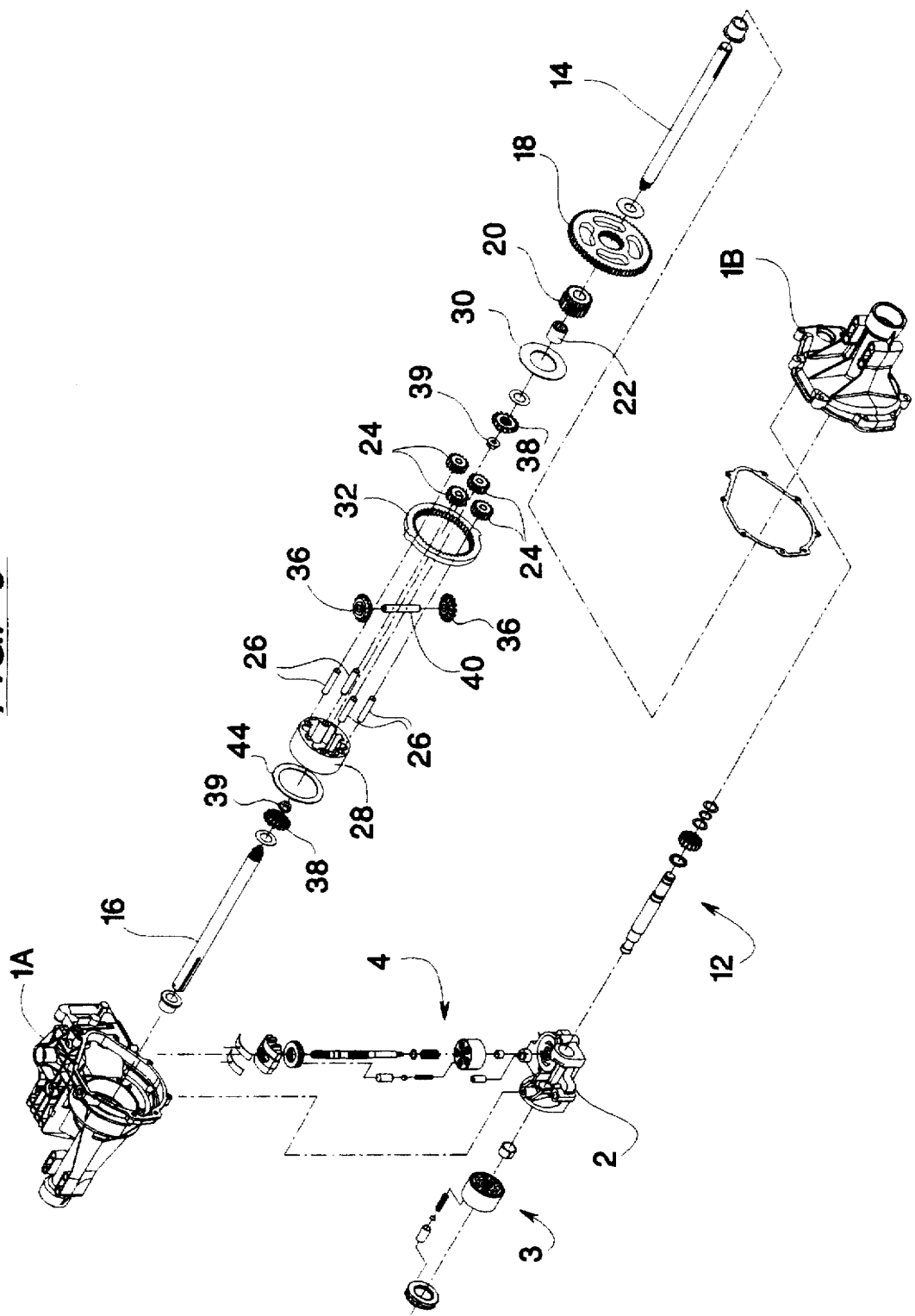
FIG. 3 illustrates an exploded, three-dimensional view of various components of a hydrostatic transmission including the differential assembly illustrated in FIGS. 1 and 2.
Figure 4:
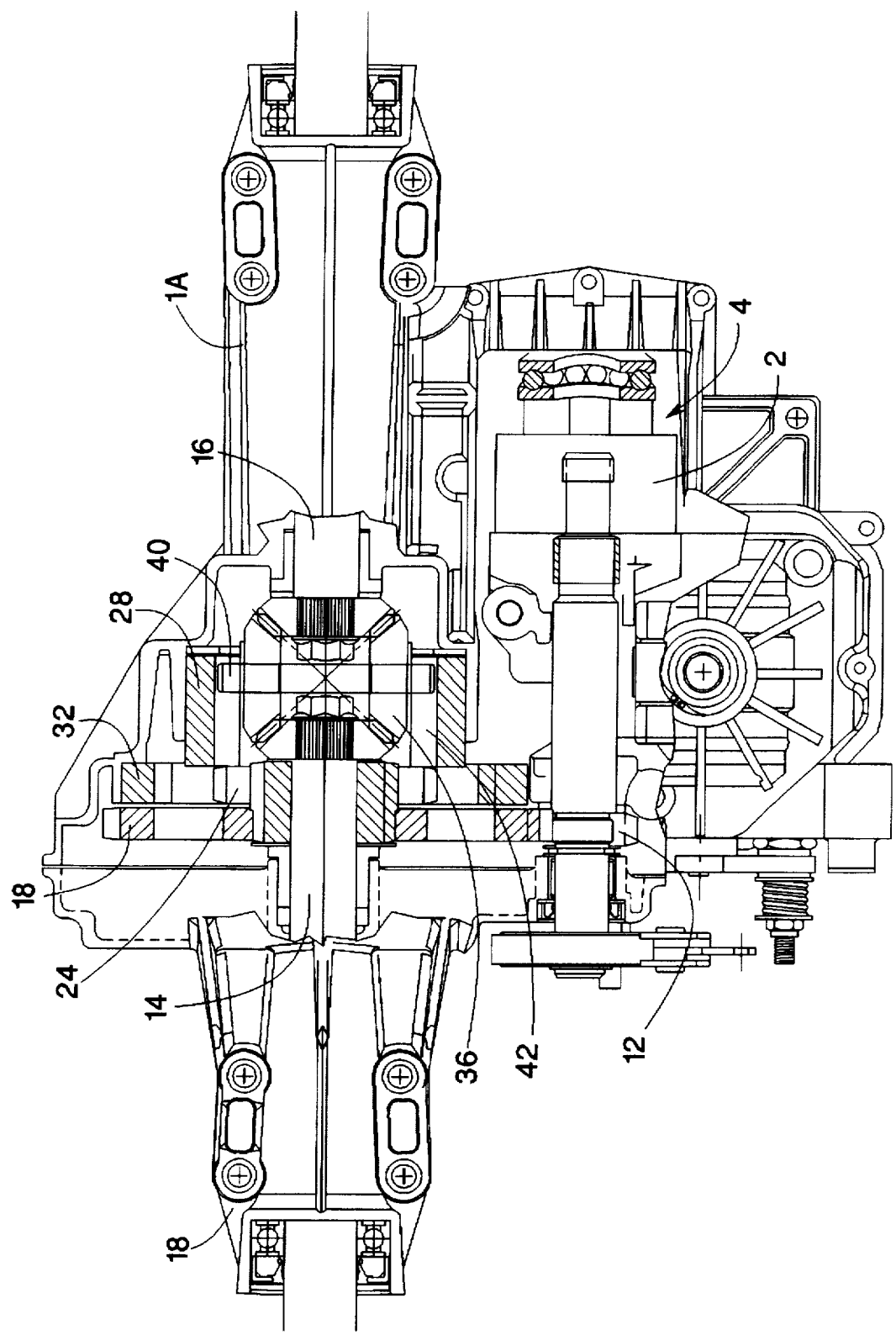
FIG. 4 illustrates the assembled hydrostatic transmission illustrated in FIG. 3.

While the present invention may be used in conjunction with any type of transaxle, it will be described hereinafter in the context of a hydrostatic transaxle as the preferred embodiment thereof. Therefore, it is to be understood that the described embodiment is not intended to be limiting.

Referring now to the figures, wherein like reference numerals refer to like elements, a differential assembly 10 constructed in accordance with the present invention is illustrated. In its preferred embodiment, the differential assembly 10 is utilized in a hydrostatic transaxle comprised of a two piece housing 1A, 1B and a center section 2 on which rides a hydraulic motor 3 and a hydraulic pump 4. A geared motor shaft 12, connected to the motor 3, imparts a motive force on the differential assembly 10 to which a pair of axle shafts 14,16 are drivingly linked. For a better understanding of interaction of these components which generally comprise a hydrostatic transaxle the reader is referred to U.S. Pat. No. 5,330,394 which has been incorporated herein by reference in its entirety.

More specifically, the differential assembly 10 comprises a spur gear 18 which drivingly connects with the geared motor shaft 12. The spur gear 18 also matingly connects with a sun gear 20. The sun gear 20 is rotatably supported on a bearing 22, such as a needle bearing, which is in turn disposed around the axle shaft 14. However, it is contemplated that the sun gear may otherwise be supported, such as being supported by axle shaft 16. Nevertheless, in the preferred embodiment, the axle shaft 14 supports the bearing 22, sun gear 20, and spur gear 18 which are concentrically arranged with respect thereto. Furthermore, since the sun gear 20 will rotate at the same rate as will the spur gear 18, it is contemplated that the sun gear 20 and spur gear 18 may be constructed as a unitary component.

Drivingly connected to the sun gear 20 are four planet gears 24 which are symmetrically disposed therearound. In the preferred embodiment, the planetary train was designed for a theoretical total of six planet gears 24, with two of the oppositely disposed planet gears being removed. Accordingly, the remaining two pairs of oppositely disposed planet gears are aligned approximately sixty degrees apart from each other in the vertical plane. However, this arrangement is not intended to be limiting as any number of planet gears may be utilized so long as the number and arrangement of the planet gears is sufficient to meet the loading requirements of the unit.

The four planet gears 24 are each rotatably mounted on a corresponding pin 26 which pins 26 extend from a planet gear carrier 28. The pins 26 and the planet gears 24 are retained by the planet gear carrier 28 and a planet thrust plate 30 disposed adjacent to the spur gear 18 and around the sun gear 20. Each of the four planet gears 24 further drivingly connect with a ring gear 32 which is fixedly attached to the transaxle housing. Specifically, the ring gear 32 is provided with a pair of projections 34 for use in fixedly maintaining the ring gear 32 within a mating shape associated with the transaxle housing.

The planet gear carrier 28 further serves the dual purpose of also carrying a differential comprised of a plurality of bevel planet gears and a pair of bevel drive gears drivingly engaged thereto. In the preferred embodiment, the differential is specifically comprised of a pair of oppositely disposed bevel planet gears 36 and a pair of oppositely disposed bevel drive gears 38 which drivingly engage with the bevel planet gears 36. The bevel drive gears 38 are each drivingly connected to a corresponding one of the axle shafts 14,16 and are retained thereon by a corresponding nut 39, retaining ring, or the like type of fastener attached to the interior end of each of the axle Shafts. As such, the bevel drive gears 38 are primarily supported by the axle shafts while the bevel planet gears 36 are supported by the bevel drive gears 38.

Furthermore, in the preferred embodiment, the bevel planet gears 36 are maintained in the planet gear carrier 28 by being rotatably, coaxially aligned on a differential cross shaft 40, the ends of which are floatingly disposed in mating slots 42 located in the planet gear carrier 28. The differential cross shaft 40 is preferably positioned such that it is approximately sixty degrees out of alignment with the two pairs of oppositely disposed planet gears 24 when viewed from side. A differential thrust plate 44 is positioned adjacent to the planet gear carrier 28 and functions as a running surface therefor.

From the foregoing description it is seen that the differential assembly which is the subject of the present invention requires a minimal amount of fasteners, namely, only the two nuts 39. The remaining components of the differential assembly are constrained through interaction with various other components found therein in conjunction with the housing. Accordingly, a differential assembly constructed in accordance with the present invention is relatively easier to manufacture as compared to most differential assemblies found in the prior art. Furthermore, the dual purpose of the planet gear carrier is seen to assist in the ease of assembly and functions to further reduce the cost of manufacture.

During operation, the rotating geared motor shaft 12 drives the spur gear 18 and, accordingly, the sun gear 20. As the sun gear 20 rotates about the axle shaft 14 over which it is disposed the four planet gears 24 are each driven to rotate about their pins 26. Meanwhile, owing to the fixed nature of the ring gear 32 and the rotation of the four planet gears 24 about their pins, the four planet gears 24, and the planet gear carrier 28 to which they are attached, are further driven to orbit about the sun gear 20. It is the orbiting planet gear carrier 28 and the bevel gears 36, 38 which follow therealong which drive the axle shafts 14,16 and the wheels mounted thereon. The symmetrical arrangement of the four planet gears 24 about the sun gear 20 and within the fixed ring gear 32 results in a near equal distribution of the gear separating forces and substantially equalized loading. This in turn reduces the stress imparted on the differential and moves the loading further up the drive train thereby reducing the inefficiency problems associated with binding. This effect is further enhanced by the floating differential cross shaft 40 which, during operation, allows the bevel gears to be positioned by tooth contact in the most optimal manner possible.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A transaxle assembly driven by an input shaft, comprising: a hydrostatic transmission comprising a plurality of hydraulic displacement units drivingly engaged to said input shaft;

an output shaft drivingly linked to said transmission;

a differential assembly, comprising:
  a first gear comprised of a spur gear which is adapted to be driven by said output shaft;
  a sun gear movable with said first gear;
  a non-movable ring gear;
  a plurality of planet gears adapted to be drivingly connected to said ring gear and to be driven by said sun gear orbitally thereabout;
  a planet gear carrier for rotatably supporting said plurality of planet gears and movable therewith; and
  a differential carried by said planet gear carrier; and
  an axle drivingly linked to said differential;
  wherein the longitudinal axis of said output shaft is spaced from the longitudinal axis of said axle.

2. The transaxle as recited in claim 1, wherein the longitudinal axis of said output shaft is parallel to the longitudinal axis of said axle.

3. The transaxle as recited in claim 1, wherein said plurality of planet gears are symmetrically disposed about said sun gear.

4. The transaxle as recited in claim 1, wherein said differential comprises a plurality of bevel planet gears and a pair of oppositely disposed bevel drive gears, said bevel drive gears being drivingly connected with said plurality of bevel planet gears and said axle.

5. The transaxle as recited in claim 4, wherein said plurality of bevel planet gears comprises a pair of oppositely disposed bevel planet gears and said differential assembly further comprises a differential cross shaft supported by said planet gear carrier which is used to maintain said pair of oppositely disposed bevel planet gears in substantial coaxial alignment.

6. The transaxle as recited in claim 5, wherein said planet gear carrier has a pair of mating slots in each of which a corresponding end of said differential cross shaft is floatingly supported.

7. The transaxle as recited in claim 1, wherein said planet gear carrier comprises a plurality of pins on each of which a corresponding one of said plurality of planet gears are rotatable supported.

8. The transaxle as recited in claim 7, further comprising a planet thrust plate associated with said plurality of planet gears for use in maintaining said plurality of planet gears on said plurality of pins.

9. The transaxle as recited in claim 1, wherein said plurality of planet gears comprises two pairs of oppositely disposed planet gears.

10. The transaxle as recited in claim 9, wherein said two pairs of oppositely disposed planet gears are aligned in a plane approximately sixty degrees apart.

11. The transaxle as recited in claim 1, wherein said sun gear is integrally formed with said spur gear.

12. A hydrostatic transaxle assembly driven by an input shaft, comprising:
  a center section having hydraulic porting formed therein;
  a hydraulic pump carried by said center section drivingly linked to said input shaft;
  a hydraulic motor carried by said center section drivingly linked to said hydraulic motor through said hydraulic porting;
  an output shaft drivingly linked to said hydraulic motor;
  a differential assembly, comprising:
    a first gear comprised of a spur gear which is adapted to be driven by said output shaft;
    a sun gear movable with said first gear;
    a non-movable ring gear;
    a plurality of planet gears adapted to be drivingly connected to said ring gear and to be driven by said sun gear orbitally thereabout;
    a planet gear carrier for rotatably supporting said plurality of planet gears and movable therewith; and
    a differential carried by said planet gear carrier; and
    an axle drivingly linked to said differential;
    wherein the longitudinal axis of said output shaft is spaced from the longitudinal axis of said axle.

13. The transaxle as recited in claim 12, wherein the longitudinal axis of said output shaft is parallel to the longitudinal axis of said axle.

14. The transaxle as recited in claim 12, wherein said plurality of planet gears are symmetrically disposed about said sun gear.

15. The transaxle as recited in claim 12, wherein said differential comprises a plurality of bevel planet gears and a pair of oppositely disposed bevel drive gears, said bevel drive gears being drivingly connected with said plurality of bevel planet gears and said axle.

16. The transaxle as recited in claim 15, wherein said plurality of bevel planet gears comprises a pair of oppositely disposed bevel planet gears and said differential assembly further comprises a differential cross shaft supported by said planet gear carrier which is used to maintain said pair of oppositely disposed bevel planet gears in substantial coaxial alignment.

17. The transaxle as recited in claim 16, wherein said planet gear carrier has a pair of mating slots in each of which a corresponding end of said differential cross shaft is floatingly supported.

18. The transaxle as recited in claim 12, wherein said planet gear carrier comprises a plurality of pins on each of which a corresponding one of said plurality of planet gears are rotatable supported.

19. The transaxle as recited in claim 18, further comprising a planet thrust plate associated with said plurality of planet gears for use in maintaining said plurality of planet gears on said plurality of pins.

20. The transaxle as recited in claim 12, wherein said plurality of planet gears comprises two pairs of oppositely disposed planet gears.

21. The transaxle as recited in claim 20, wherein said two pairs of oppositely disposed planet gears are aligned in a plane approximately sixty degrees apart.

22. The transaxle as recited in claim 12, wherein said sun gear is integrally formed with said spur gear.

23. A hydrostatic transaxle assembly driven by an input shaft, comprising:
  a center section having hydraulic porting formed therein;
  a hydraulic pump carried by said center section drivingly linked to said input shaft;
  a hydraulic motor carried by said center section drivingly linked to said hydraulic motor through said hydraulic porting;
  an output shaft drivingly linked to said hydraulic motor;
  a differential assembly, comprising:
    a first gear comprised of a spur gear which is adapted to be driven by said output shaft;
    a sun gear movable with said first gear;
    a non-movable ring gear;
    a plurality of planet gears adapted to be drivingly connected to said ring gear and to be driven by said sun gear orbitally thereabout;
    a planet gear carrier for rotatably supporting said plurality of planet gears and movable therewith;

a differential carried by said planet gear carrier comprising a pair of oppositely disposed bevel planet gears and a pair of oppositely disposed bevel drive gears matingly engaged therewith; and a differential cross shaft supported by said planet gear carrier for use in maintaining said pair of bevel planet gears in substantial alignment;

wherein said planet gear carrier has a pair of mating slots in each of which a corresponding end of said differential cross shaft is floatingly supported; and an axle drivingly linked to said bevel drive gears.

24. A hydrostatic transaxle assembly driven by an input shaft, comprising:

a center section having hydraulic porting formed therein;

a hydraulic pump carried by said center section drivingly linked to said input shaft;

a hydraulic motor carried by said center section drivingly linked to said hydraulic motor through said hydraulic porting;

an output shaft drivingly linked to said hydraulic motor;

a differential assembly, comprising:
 a gear which is adapted to be driven by said output shaft;
 a gear carrier adapted to be driven by said gear;
 a differential carried by said gear carrier comprising a pair of oppositely disposed bevel planet gears and a pair of oppositely disposed bevel drive gears matingly engaged therewith; and
 a differential cross shaft supported by said gear carrier for use in maintaining said pair of bevel planet gears in substantial alignment;
 wherein said planet gear carrier has a pair of mating slots in each of which a corresponding end of said differential cross shaft is floatingly supported; and an axle drivingly linked to said bevel drive gears.

25. A transaxle assembly driven by an input shaft, comprising:

an output shaft drivingly linked to said input shaft;

a differential assembly, comprising:
 a first gear comprised of a spur gear which is adapted to be driven by said output shaft;
 a sun gear movable with said first gear;
 a non-movable ring gear;
 a plurality of planet gears adapted to be drivingly connected to said ring gear and to be driven by said sun gear orbitally thereabout;
 a planet gear carrier for rotatably supporting said plurality of planet gears and movable therewith; and
 a differential carried by said planet gear carrier, wherein said differential comprises a pair of oppositely disposed bevel planet gears drivingly connected to a pair of oppositely disposed bevel drive gears:
 said differential assembly further comprises a differential cross shaft supported by said planet gear carrier which is used to maintain said pair of oppositely disposed bevel planet gears in substantial coaxial alignment and wherein said planet gear carrier has a pair of mating slots in each of which a corresponding end of said differential cross shaft is floatingly supported; and an axle drivingly linked to said differential;

wherein the longitudinal axis of said output shaft is spaced from the longitudinal axis of said axle.

26. A transaxle assembly driven by an input shaft, comprising:

an output shaft drivingly linked to said input shaft;

a differential assembly, comprising:
 a first gear comprised of a spur gear which is adapted to be driven by said output shaft;
 a sun gear movable with said first gear;
 a non-movable ring gear;
 a plurality of planet gears adapted to be drivingly connected to said ring gear and to be driven by said sun gear orbitally thereabout;
 a planet gear carrier for rotatably supporting said plurality of planet gears and movable therewith, wherein said planet gear carrier comprises a plurality of pins on each of which a corresponding one of said plurality of planet gears are rotatable supported;
 a planet thrust plate associated with said plurality of planet gears for use in maintaining said plurality of planet gears on said plurality of pins
 a differential carried by said planet gear carrier; and an axle drivingly linked to said differential;

wherein the longitudinal axis of said output shaft is spaced from the longitudinal axis of said axle.

\* \* \* \* \*